United States Patent
Yu et al.

(10) Patent No.: US 10,650,482 B1
(45) Date of Patent: May 12, 2020

(54) PARALLEL RENDERING ENGINE

(71) Applicant: Adobe Inc., San Jose, CA (US)

(72) Inventors: Zhan Yu, San Jose, CA (US); Yumin Jia, San Jose, CA (US); Jinoh Oh, San Jose, CA (US); Haiting Lin, Santa Clara, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/186,216

(22) Filed: Nov. 9, 2018

(51) Int. Cl.
- *G06T 1/20* (2006.01)
- *G06T 9/00* (2006.01)
- *G06T 17/00* (2006.01)
- *G06F 9/38* (2018.01)

(52) U.S. Cl.
CPC .............. *G06T 1/20* (2013.01); *G06F 9/3885* (2013.01); *G06T 17/00* (2013.01); *G06T 2210/52* (2013.01); *G06T 2210/61* (2013.01)

(58) Field of Classification Search
None
See application file for complete search history.

(56) References Cited

U.S. PATENT DOCUMENTS

| | | | |
|---|---|---|---|
| 8,294,704 B1 | 10/2012 | Garrity | |
| 9,171,390 B2 | 10/2015 | Sumner et al. | |
| 9,214,005 B2 | 12/2015 | Elmieh et al. | |
| 9,508,181 B2 * | 11/2016 | Kim | G06T 15/00 |
| 9,665,978 B2 | 5/2017 | Chuang et al. | |
| 9,691,177 B2 | 6/2017 | Silvennoinen et al. | |
| 9,704,288 B2 | 7/2017 | De Aguiar et al. | |
| 9,792,720 B2 | 10/2017 | Gies et al. | |
| 9,824,166 B2 | 11/2017 | Morales et al. | |
| 9,852,538 B2 | 12/2017 | Jenkins | |
| 9,892,546 B2 | 2/2018 | Jenkins | |
| 9,898,866 B2 | 2/2018 | Fuchs et al. | |
| 9,916,763 B2 | 3/2018 | Jenkins | |
| 9,978,115 B2 | 5/2018 | de Riehebonrg et al. | |
| 10,008,019 B2 * | 6/2018 | Ligenza | G06T 13/20 |
| 10,109,103 B2 | 10/2018 | Jenkins | |
| 10,111,099 B2 | 10/2018 | Hunt et al. | |
| 10,210,382 B2 | 2/2019 | Shotton et al. | |
| 10,217,266 B2 | 2/2019 | Howson et al. | |
| 10,222,910 B1 | 3/2019 | El Dokor et al. | |
| 10,248,744 B2 | 4/2019 | Sehissler et al. | |
| 2002/0063704 A1 * | 5/2002 | Sowizral | G06T 15/005 345/419 |
| 2008/0278482 A1 | 11/2008 | Farmanbar et al. | |
| 2009/0002379 A1 * | 1/2009 | Baeza | G06T 1/20 345/522 |
| 2009/0027383 A1 * | 1/2009 | Bakalash | G06F 9/5044 345/419 |
| 2014/0168239 A1 | 6/2014 | Elmieh et al. | |
| 2016/0350245 A1 * | 12/2016 | Shen | G06F 9/4843 |
| 2016/0358306 A1 * | 12/2016 | Begeman | G06T 17/005 |

(Continued)

*Primary Examiner* — Nurun N Flora
(74) *Attorney, Agent, or Firm* — Kilpatrick Townsend & Stockton LLP

(57) ABSTRACT

This application relates generally to parallel computer processing, and more specifically, to parallel processing within a rendering engine via parallel scene graphs. One or more parallel scene graphs or parallel data graphs may be provided to a rendering engine. The rendering engine may identify dependencies within the parallel data structures and process, in parallel, one or more aspects of a the parallel data structure.

20 Claims, 6 Drawing Sheets

(56) References Cited

U.S. PATENT DOCUMENTS

2017/0148131 A1    5/2017    de Riehebonrg et al.
2018/0088989 A1*  3/2018    Nield .................... G06F 9/4893
2018/0365058 A1*  12/2018  Nield .................... G06F 9/3836
2019/0205736 A1*  7/2019    Bleiweiss ............. G06N 20/00

* cited by examiner

PARALLEL RENDERING ENGINE

TECHNICAL FIELD

This application relates generally to parallel computer processing, and more specifically, to parallel processing within a rendering engine via parallel scene graphs.

BACKGROUND

Over time, processing has moved from increased frequency processing (e.g., increasing the processing speed) to increased core processing (e.g., parallel processing). While newer central processing units (CPUs) and graphical processing units (GPUs) may, via their hardware capabilities, support parallel processing, current rendering engines have limited support for parallel processing. For example, many rendering engines run an established set of GPU Application Program Interfaces (APIs) such as DX9-11, OpenGL 4.x, and the like, which provide limited support for parallelism. Thus, to take advantage of parallel processing capabilities of newer hardware sets, there is a need for a rendering engine with a parallel design.

Current systems exist that attempt to provide parallel processing in rendering engines by using ad-hoc methods. However, such ad-hoc methods do not fully take advantage of the parallel processing capabilities of the underlying hardware as most ad-hoc methods attempt to parallelize serial data structures. There is a need to provide a parallel data structure that may be input to a parallel rendering engine in order to take full advantage of the parallel processing abilities of modern processing units.

BRIEF SUMMARY

One or more embodiments may disclose a computer-implemented method for performing parallel processing. The method may comprise receiving a first plurality of batches. In one embodiment, each batch in the first plurality of batches may comprise multiple first processing jobs and the first plurality of batches can be associated with first data objects in a first processing stage. The method may further comprise receiving a second plurality of batches. In one embodiment, each batch in the second plurality of batches may comprise multiple second processing jobs and the second plurality of batches are associated with second data objects in a second processing stage. The method may further comprise identifying a first dependency link between one or more batches in the first plurality of batches. The first dependency link may indicate a processing order associated with the one or more batches in the first plurality of batches. The method may further comprise identifying a second dependency link between one or more batches in the second plurality of batches. In one embodiment, the second dependency link may indicate a processing order associated with the one or more batches in the second plurality of batches. The method may further comprise processing, for each batch in the first plurality of batches, the multiple first processing jobs in parallel to produce a first layer of results. The method may further comprise in response to producing the first layer of results, processing, for each batch in the second plurality of batches, the multiple second processing jobs in parallel to produce a second layer of results on top of the first layer.

In one embodiments, the method may further comprise receiving a third plurality of batches. In one embodiment, each batch in the third plurality of batches may comprise multiple third processing jobs and the third plurality of batches are associated with the first data objects in a first processing stage. The method may further comprise identifying a third dependency link between one or more batches in the third plurality of batches. In one embodiment, the third dependency link indicating a processing order associated with the one or more batches in the third plurality of batches. The third dependency link may be distinct from the first dependency link. The method may further comprise prior to processing the first processing stage, processing, for each batch in the third plurality of batches, the multiple third processing jobs in parallel to produce results for the first data objects.

In one embodiment, the first plurality of batches and the first dependency link are part of a first data graph. In such an embodiment, each batch of the first plurality of batches is a node within the first scene graph and the first dependency link indicates relationships between each node.

In one embodiment, the second plurality of batches and the second dependency link are part of a second data graph. In such an embodiment, each batch of the second plurality of batches is a node within the second scene graph and the second dependency link indicates relationships between each node.

In one embodiment, the processing job is an atomic unit for processing that is processed by a graphics processing unit (GPU).

BRIEF DESCRIPTION OF THE FIGURES

The patent or application file contains at least one drawing executed in color. Copies of this patent or patent application publication with color drawing(s) will be provided by the Office upon request and payment of the necessary fee.

Features, embodiments, and advantages of the present disclosure are better understood when the following Detailed Description is read with reference to the accompanying drawings.

DETAILED DESCRIPTION

Figure 1:
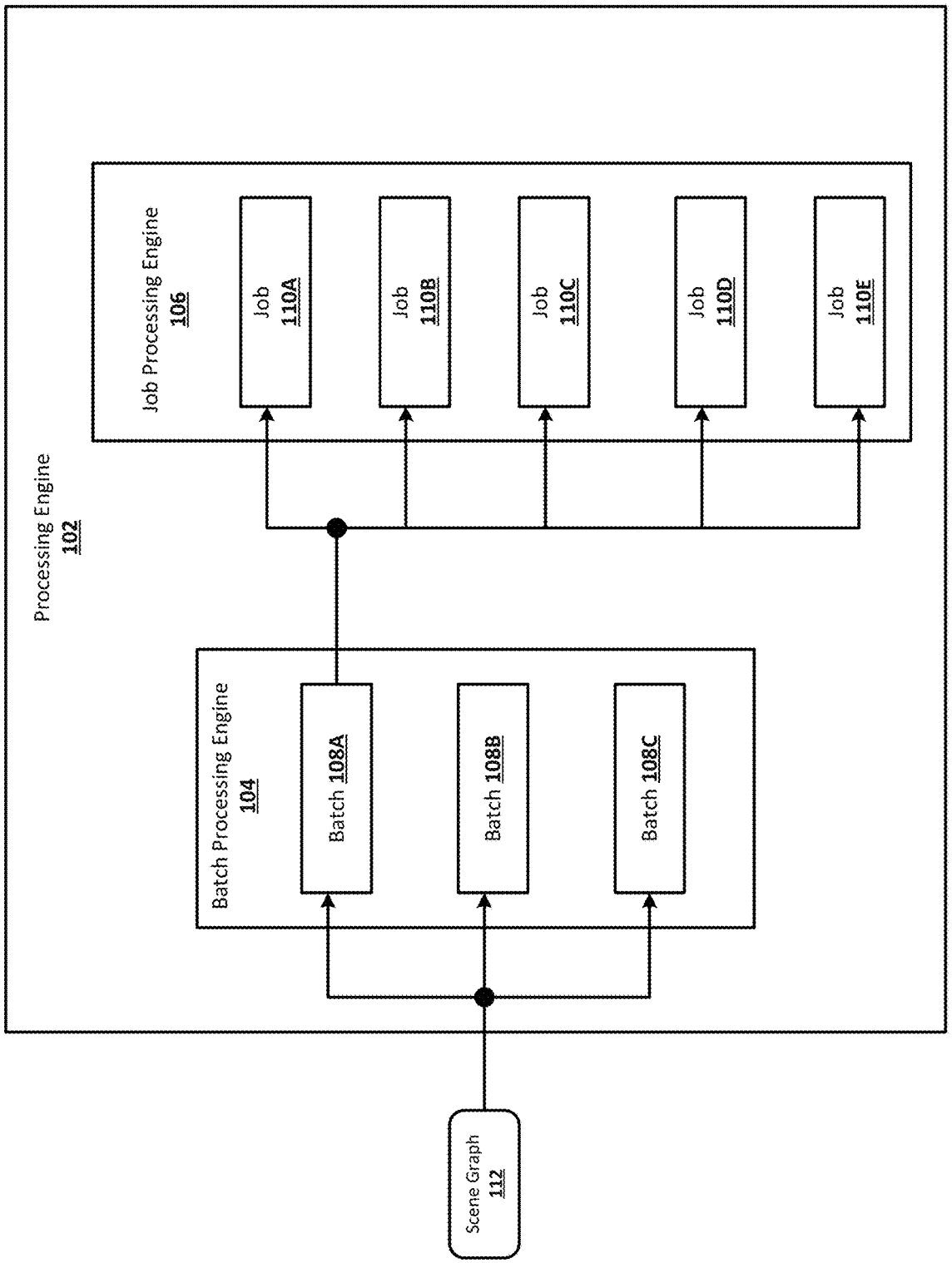
FIG. 1 illustrates an exemplary processing engine in accordance with one or more embodiments.

Techniques disclosed herein relate generally to parallel computer processing. More specifically, some embodiments relate to parallel processing within a rendering engine via parallel scene graphs. Various embodiments are described herein, including methods, systems, non-transitory computer-readable storage media storing programs, code, or instructions executable by one or more processors, and the like.

One of the many challenges in producing a parallel rendering engine may include determining a proper data structure for the parallel rendering engine. Typical rendering engines may accept, as a data structure, a single scene graph. The scene graph describes the logical and spatial representation of a graphical scene as well as dependencies within the graphical scene. However, a single scene graph is used throughout all of the processing steps of a rendering engine. For example, a deferred rendering pipeline may consist of several stages including a depth pass stage, a stencil pass stage, transparency, and various G-buffer stages. In such an example, in each of these stages, the same scene graph may be used. However, in each of these stages the single scene graph may contain unnecessary dependencies between objects. For example, a single scene graph may indicate that object 1 is dependent on object 2, which is dependent on object 3. Thus, in a traditional rendering engine each stage of the rendering process would process object 1, then object 2, then object 3. However, such dependencies between the objects may be unnecessary at different stages of the rendering process. For example, those dependencies may be needed when calculating transparency, but not when calculating depth values. As a result, a single scene graph can unnecessarily restrict potential parallel computations inside particular rendering stages/processes.

Another challenge in producing a parallel rendering engine is designing a parallel rendering engine to accept multiple scene graphs. Traditional rendering engines may operate on a single scene graph. Even if a user were allowed to provide multiple scene graphs traditional rendering engines may not accept and process the scene graphs in an intended manner. Traditional rendering engines may attempt an ad-hoc parallelization of a scene graph by taking a single scene graph and attempting to find parts of the scene graph that may be parallelized. However, this type of ad-hoc processing may only take advantage of a very limited amount of the parallel processing power of the underlying hardware. Not only should a proper data structure be provided that supports parallel computation, but there also must be a rendering engine which may accept and correctly utilize this data structure.

According to some aspects of the present disclosure, techniques for creating a parallel rendering engine with a new data structure are disclosed. In some embodiments, techniques are provided for adopting parallel scene graph structures. Traditionally, there may exist a single scene graph for all stages of the rendering process. However, each stage of the rendering process (or any computing process) may have separate necessary dependencies. As a result, implementing a different scene graph for each stage within the rendering process may be provided, such that no unnecessary dependencies exist at each processing stage. By eliminating these unnecessary dependencies rendering stages may process faster by utilizing parallel processing.

A parallel scene graph may be created for each stage within the rendering process. A regular scene graph may have a single task or object as a node within the scene graph. In contrast, the parallel scene graph has batches as a nodes within the parallel scene graph. A batch may be a compilation of jobs that may be processed in parallel. A job may be an atomic unit for processing. Each node in the parallel scene graph may be referred to as a batch node. Dependencies between batch nodes may be indicated by the parallel scene graph. Furthermore, each parallel scene graph may contain dependencies between batch nodes just for that particular processing stage. Thus, each parallel scene graph indicates dependencies specific to that processing stage. In addition, the batch nodes within the parallel scene graph is a new data structure that may allow data to be input into the parallel rendering engine in a parallel fashion. This means during initial coding a programmer may provide batch nodes to the parallel scene graph. Thus, the code can be received by the parallel rendering engine in a parallel structure. This is advantageous over current systems which take sequential code and attempts, via an ad-hoc process, to find parallelization within the code, because the parallel scene graph data structure may allow for more code to be input in a parallelized manner. By receiving code in a parallelized manner the parallel rendering engine may provide parallel processing with more computations than if the code was received in a serial manner, which may lead to a higher frame rate than compared to traditional rendering engines with traditional data structures.

The parallel scene graph can be expanded to pre-rendering processing. When a scene graph is used for pre-rendering processing it may be referred to as a data graph. A scene graph may be typically used in rendering, but allowing a parallel scene graph to be used in pre-rendering stages may aid in providing true parallel processing. Rendering typically involves generating an image from a two dimensional (2D) or three dimensional (3D) model. This model may have particular characteristics that may be defined by, for example, physics calculations, animation calculations, and the like. These calculations may control how objects within the model react with each other or the environment. Some parts of these calculations or computing processes associated with these calculations may be represented by parallel scene graphs. For example, if there was a 3D model of a human body there may be an animation associated with the human body. In such an example, a first batch node may indicate torso of the body, a second batch node can be dependent upon the first batch and the second batch node can indicate the arms and legs of the body. This may be because the animation of the arms and legs are dependent on the animation of the torso, but the animation of the arms and legs are conditionally independent of each other given the torso condition. Thus, animation calculations for the torso may happen in a first processing stage, then the animation calculation of the arms and legs may happen in parallel in a second processing stage. By utilizing parallel scene graphs for pre-rendering processing, efficient parallel processing may be achieved, which can improve computer processing speeds within a computing system.

FIG. 1 illustrates exemplary processing engine 102 in accordance with one or more embodiments of the disclosure. Processing engine 102 may be implemented by one or more processing units (e.g., batch processing engine and job processing engine) and one or more sets of memory. Such a processing unit can be implemented as one or more integrated circuits, such as multicore processor. In one embodiment, the processing unit may also be implemented as a quad-core processing unit formed by integrating two dual-core processors into a single chip. In various embodiments, the processing unit can execute a variety of programs in response to program code and can maintain multiple concurrently executing programs or processes. Through suitable programming, the processing unit can provide various functionalities described within this disclosure. The memory may be volatile (such as random access memory (RAM)) and/or non-volatile (such as read-only memory (ROM), flash memory, etc.) The RAM may contain data and/or program modules that are immediately accessible to and/or presently being operated and executed by the processing unit. In some implementations, the memory may include multiple different types of memory, such as static random access memory (SRAM) or dynamic random access memory (DRAM). The memory may also be a tangible computer-readable storage medium for storing the basic programming and data constructs that provide the functionality of some embodiments described by this disclosure. The memory may further comprise software (programs, code modules, instructions) that when executed by the processing unit provide the functionality described by this disclosure. Processing engine 102 may include a batch processing engine 104, a job processing engine 106. Processing engine 102 may take one or more parallel scene graph(s) 112 as an input.

Parallel scene graph 112 may be one or more parallel scene graphs. Parallel scene graph 112 describes the logic and spatial relationships between objects within a scene, a 3D model, a 2D model, and the like. Parallel scene graph 112 may be comprised of a plurality of batch nodes and dependency links. The batch nodes may contain a plurality of jobs that may be executed in parallel. Each job may be associated with an object. The dependency links may detail dependencies between batch nodes. For example, a dependency link may indicate to processing engine 102 that a first batch node must be processed prior to processing a second batch node. Parallel scene graph 112 may be input into processing engine 102 in order to perform one or more computational processes involving, for example, rendering, creating 3D models, determining animation characteristics of a model, determining the physics characteristics of a model, generating audio, and the like.

Batch processing engine 104 may be a processing device that batches or groups together one or more jobs that are indicated in a batch node. Parallel scene graph 112 may be received by batch processing engine 104. Batch processing engine 104 may identify one or more batch nodes and dependency links within parallel scene graph 112. Each batch node may contain a plurality of jobs. Batch processing engine 104 may batch together these particular jobs. Each batched group of jobs is shown as a batch within FIG. 1. For example, batch 108A may represent a first batch of jobs, batch 108B may represent a second batch of jobs, and batch 108C may represent a third batch of jobs. Batch processing engine 104 may also determine, based on the dependency links within parallel scene graph 112, an order in which to feed a batch to job processing engine 106 for further processing. For example, if a first batch is dependent on a second batch, then it may be necessary to transmit, by batch processing engine 104, the second batch prior to the first batch, such that the second batch may be processed prior to the first. In one embodiment, the batch processing engine may form one or more batches in any order regardless of the dependencies indicated in parallel scene graph 112. In such an instance, batch processing engine 104 may still transmit the batch to job processing engine in accordance with the dependency links within parallel scene graph 112, but may create the batches in a different order. Batch processing engine 104 may also determine and associate each batch with batch metadata such as an associated GPU or CPU, an associated GPU core or CPU core, a processing order value, a job processing order, and the like. Batch processing engine 104 may be implemented by one or more processing units and one or more sets of memory Job processing engine 106 may be a processing device that processes one or more jobs. A job may be an atomic unit for processing. For example, a job may be a calculation such as an addition, subtraction, division, modulus, an AND operation, OR operation, or any other logic operation, and the like. In another example, a job may be the initialization of a variable, the storing of a variable, accessing a variable, and the like. Job processing engine 106 may receive from batch processing engine 104 a first batch that contains a plurality of jobs that may be executed in parallel. In FIG. 1, jobs 110A-110E are the jobs contained in batch 108A. The batches received by job processing engine 106 may be based on dependencies within parallel scene graph 112. Once job processing engine 106 receives a batch then job processing engine 106 may process the plurality of jobs within the batch. To asynchronously process jobs, job processing engine 106 may implement one or more thread pools. A thread pool may be a plurality of threads that may execute in parallel and independently. In one embodiment, there is a job queue that may hold a plurality of jobs (e.g., jobs 110A-110E). Each job from the job queue is then fed into an available thread of the thread pool. When a thread is done executing a new job is input into the thread from the job queue. The thread pool may allow for parallel and asynchronous execution of jobs. FIG. 1 illustrates a single batch being processed. However it is within the scope of this disclosure to process a plurality of batches in parallel.

Figure 2:
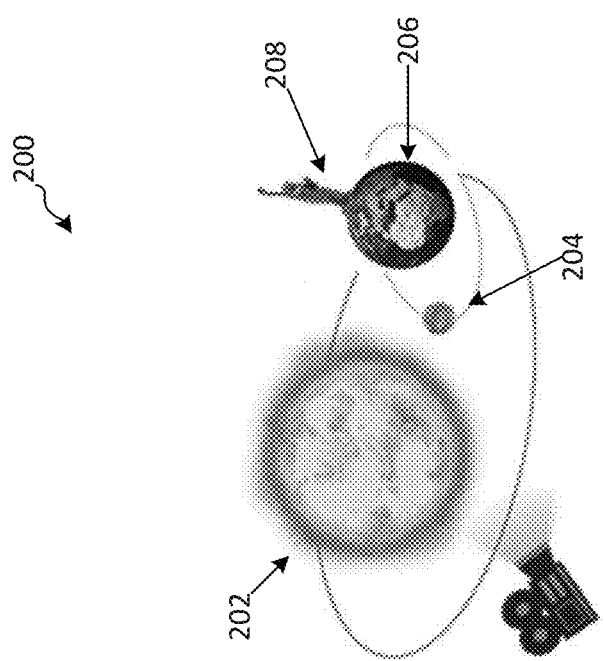
FIG. 2 illustrates an exemplary scene in accordance with one or more embodiments.

FIG. 2 illustrates exemplary scene 200. Scene 200 may be a scene or model that is rendered according to one or more embodiments of the disclosure. Scene 200 comprises sun 202, moon 204, earth 206, and statue 208. Sun 202, moon 204, earth 206, and statue 208 may be considered objects of scene 200. In scene 200, statue 208 is connected to the top of earth 206, moon 204 is orbiting earth 206, and earth 206 is orbiting sun 202. In one embodiment, scene 200 may be a 3D model that has yet to be rendered. Scene 200 may be associated with various pre-rendering processing stages. For example, there may be a physics processing stage that may calculate or generate the physics between objects in scene 200. In such an example, there may be a physics calculation between earth 206 and moon 204 in order to determine the speed and location in space and/or the speed and location with which moon 204 may orbit earth 206.

Figure 3:
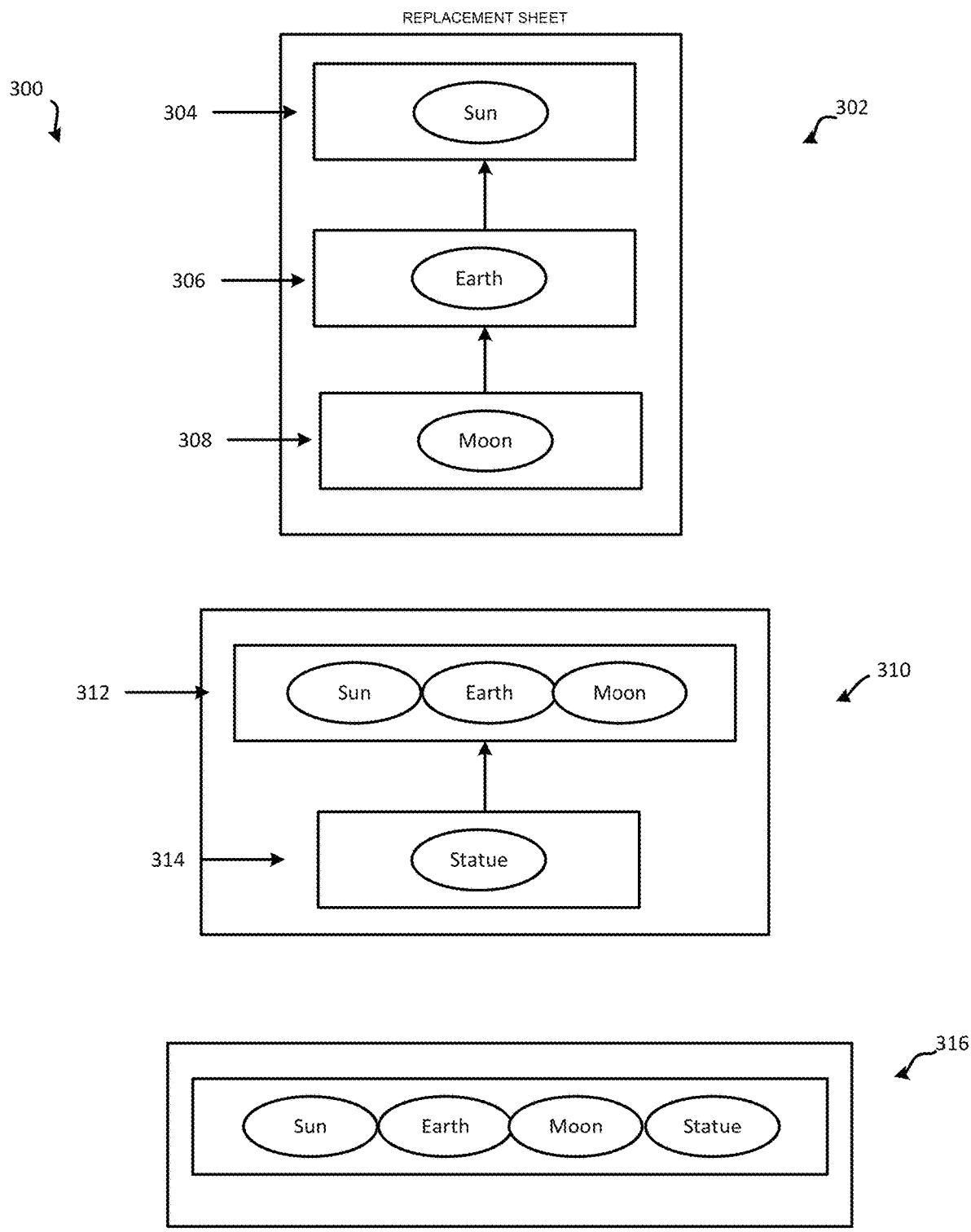
FIG. 3 illustrates example parallel scene graphs associated with one or more embodiments.

FIG. 3 illustrates exemplary parallel scene graphs 300 associated with scene 200. Parallel scene graphs 300 comprise of physics parallel scene graph 302, animation parallel scene graph 310, and rendering parallel scene graph 316. Physics parallel scene graph 302 may comprise batch node 304, batch node 306, and batch node 308. Each of batch nodes 304-308 may correspond to a different batch node within physics parallel scene graph 302. Batch node 304 may contain a plurality of jobs associated with the physics of the sun (e.g., sun 202 in FIG. 2) within a 3D model or a scene. Batch node 306 may contain a plurality of jobs associated with the physics of the earth (e.g., earth 206 in FIG. 2) within a 3D model or a scene. Batch node 308 may contain a plurality of jobs associated with the physics of the moon (e.g., moon 204 in FIG. 2). Based on physics parallel scene graph 302, batch node 308 is dependent on batch node 306, which is dependent on batch node 304. In other words, the physics of the moon is based on the physics of the earth, which is based on the physics of the sun. As a result, the physics of the sun (and its corresponding jobs) will be processed first, then the physics of the earth (and its corresponding jobs) will be processed second, and then the physics of the moon (and its corresponding jobs) will be processed third.

Animation parallel scene graph 310 may comprise of batch node 312 and batch node 314. Batch nodes 312 and 314 may correspond to a different batch nodes within animation parallel scene graph 310. In one embodiment, animation parallel scene graph 310 is different from physics parallel scene graph 302. This may be because the animation processing may have different dependencies between objects than the physics processing. Batch node 312 may contain a plurality of jobs associated with the animation of the sun, earth, and moon within a 3D model or a scene. By having jobs associated with the animation of the sun, earth, and moon in a single batch it indicates that the animation processing of the sun, earth, and moon are independent and may be done in parallel. Batch node 314 may contain a plurality of jobs associated with the animation of the statue (e.g., statue 208 in FIG. 2) within a 3D model or a scene. Based on the animation parallel scene graph 310, batch node 314 is dependent on batch node 312. In other words, the animation of the statute is based at least on the animation of the earth. As a result, the animation of the sun, earth, and moon will be processed first because the sun, earth, and the moon have no dependencies and may be all processed in parallel. Next, the animation of the statue will be processed because the animation of the statue depends on the animation of the earth. In one embodiment, the animation of the sun, earth, and moon may not be processed in parallel. Instead, for example, the animation for the earth may be processed first, then the animations of the sun and moon, and finally the animation of the statue. In one embodiment, the only restriction in processing is if there is a dependency within a corresponding parallel scene graph.

Rendering parallel scene graph 316 may only have one batch. In one embodiment, rendering parallel scene graph 316 is different from animation parallel scene graph 310 and physics parallel scene graph 302. This may be because the rendering processing may have different dependencies between objects than the physics and/or animation processing. The batch node within rendering parallel scene graph 316 may contain a plurality of jobs associated with rendering the sun, earth, moon, and statue within a 3D model or scene. By having jobs associated with the rendering of the sun, earth, moon, and statue in a single batch it indicates that the rendering processing of the sun, earth, moon, and statue are independent and may be done in parallel.

In one or more embodiments associated with FIG. 2 and FIG. 3 the whole rendering process may utilize a single parallel scene graph that may be different from parallel scene graphs associated with pre-rendering processing stages. However, it is within the scope of this disclosure to have multiple parallel scene graphs that correspond to different processing stages of the rendering process. For example, there may be a first parallel scene graph for the animation of a model, a second parallel scene graph for depth processing, a third parallel scene graph for detecting and processing surface normals, and a fourth for parallel scene graph for shadow processing, and the like. In such an example, the second parallel scene graph, the third parallel scene graph, and the fourth parallel scene graph are all related to different stages in the rendering process.

Figure 4A:
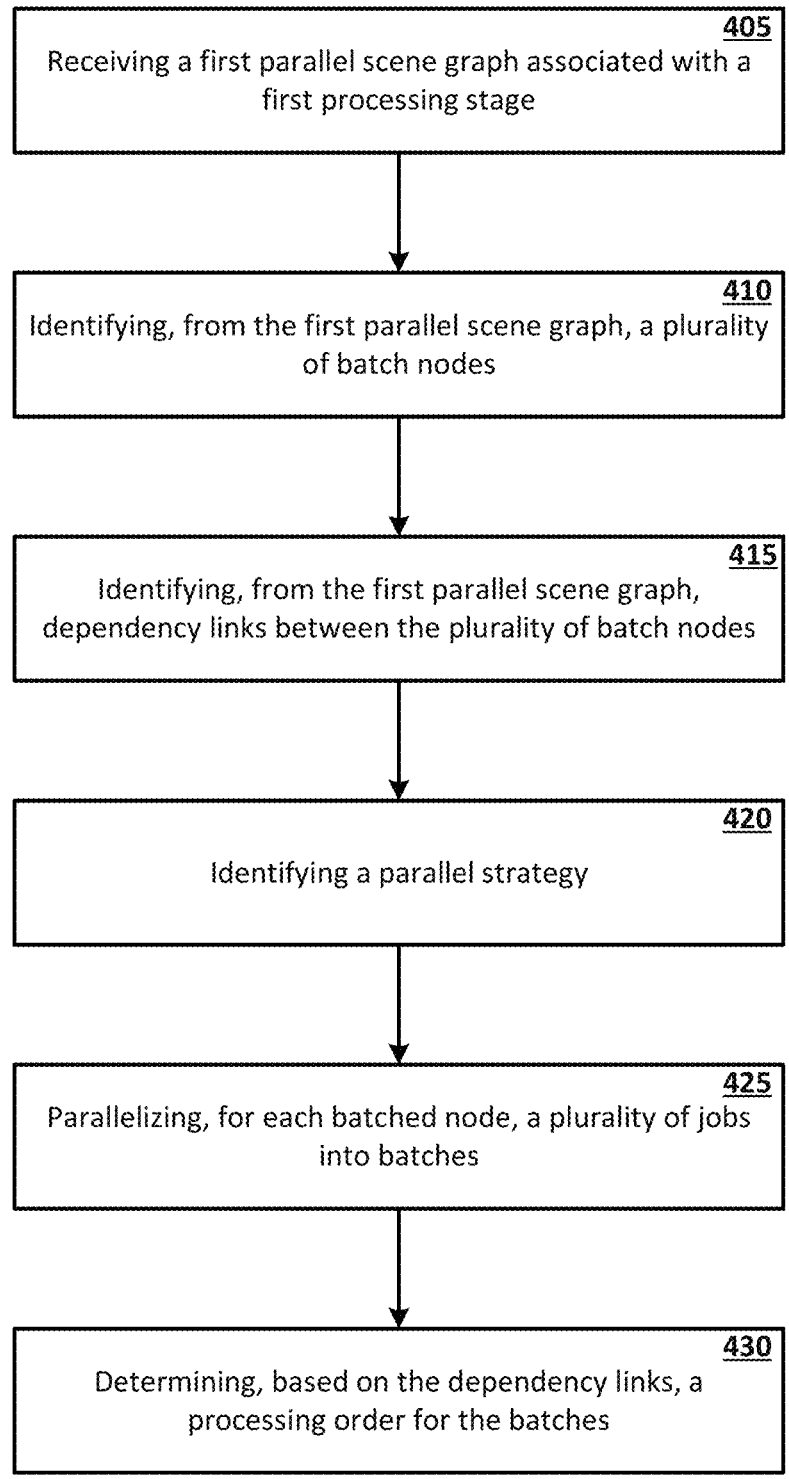
FIG. 4A illustrates an example process in accordance with one or more embodiments.
Figure 4B:
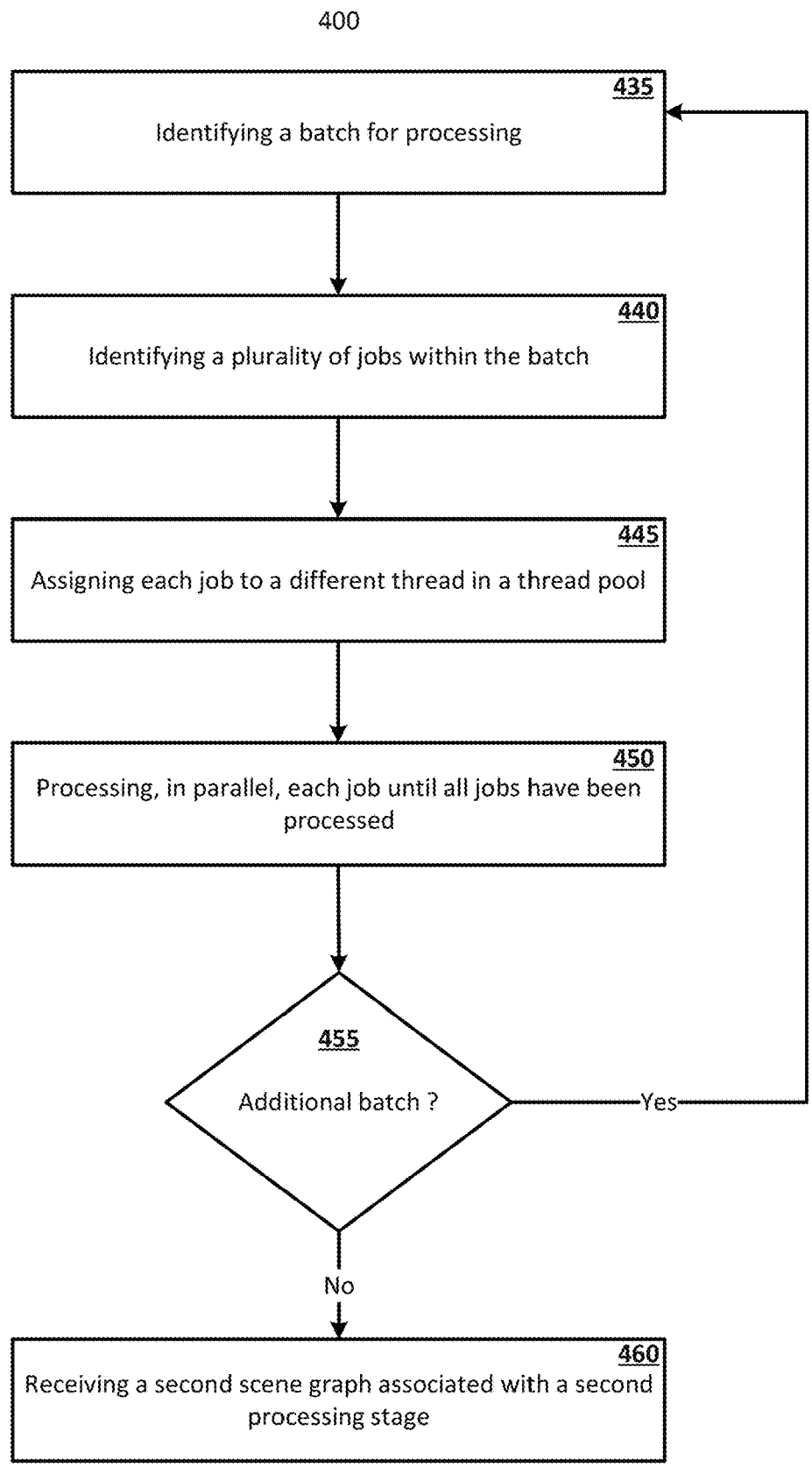
FIG. 4B illustrates an example process in accordance with one or more embodiments.

FIGS. 4A and 4B illustrate exemplary process 400 for implementing a parallel processing engine with a parallel data structure. Process 400 may be implemented by one or more parts of processing engine 102 (as shown in FIG. 1). At 405, a processing engine receives a first parallel scene graph associated with a first processing stage. The first processing stage may be a processing stage associated with a pre-rendering processing stage such as, physics processing, geometry processing, animation processing, audio processing, and the like. In one embodiment, the first processing stage may be a processing stage associated with rendering processing, such as depth processing, shadow processing, light processing, normal processing, transparency processing, processing associated with geometry buffers (G-buffers), and the like. The first parallel scene graph may indicate relationships between objects. The first parallel scene graph may comprise of several batch nodes. Each batch node may be a compilation of jobs that may be processed in parallel. The first parallel scene graph may contain dependencies (e.g., dependency links) between objects. These dependencies may be specific to the first processing stage and each processing stage may have different dependencies between the same objects.

At 410, the processing engine identifies, from the first parallel scene graph, a plurality of batch nodes. The first parallel scene graph may contain one or more batch nodes. In one embodiment, the processing engine may receive a traditional scene graph (instead of a parallel scene graph) that does not have batch nodes. In such an embodiment, the processing engine may determine which tasks in the traditional scene graph are at the same depth level and group those tasks together as a batch. For example, if a traditional scene graph is received that indicates a statue and a moon (e.g., level 3) are dependent on an earth (e.g., level 2) which is dependent on a sun (e.g., level 1). Then the processing engine may attempt to batch together the statue and moon for the first processing stage because they are at the same depth level. Such a technique may allow the processing engine to establish one or more batches from a traditional scene graph.

At 415, the processing engine identifies, from the first parallel scene graph, dependency links between the plurality of batch nodes. The first parallel scene graph may contain one or more dependency links. The dependency links may indicate an order of processing associated with one or more batch nodes. For example, if batch node 1 is dependent on batch node 2, then the jobs within batch node 2 should be processed prior to the jobs in batch node 1. The dependency links may effectively limit the batches and jobs within those batches that may be processed in parallel.

At 420, the processing engine identifies a parallel strategy. The processing engine may support a parallel batch processing mode and a sequential batch processing mode. The processing mode may be determined by a value within a register within the processing engine. The value within the register may be changed by a user associated with the processing engine. In parallel processing mode, batches may be processed in parallel. In sequential batch processing node, only one batch may be processed at time. In some embodiments, sequential batch processing may be necessary for example resizing a background image may be needed to other aspects of the rendering process (e.g., shading). In sequential batch processing, the jobs associated with a batch are processed in parallel, but the batches themselves may be processed sequentially.

At 425, the processing engine parallelizes, for each batched node, a plurality of jobs into batches for processing. Each batched node may contain a plurality of jobs. The processing engine may form a batch that contains the plurality of jobs for a respective batch node. The processing engine may generate batch metadata for each batch. Batch metadata may comprise an associated GPU or CPU, an associated GPU core or CPU core, a processing order value, a job processing order value, and the like. In one embodiment, different batches (or groups of batches) may be associated (for later transmitted and processing) with different cores of a GPU or CPU. For example, a processing engine may associate a first batch group with a first core of a CPU, a second batch group with a second core of a CPU, a third batch group with a third core of a CPU and the like. In one embodiment, the processing engine may split the batches or group of batches between CPU cores and GPU cores. For example, a first batch group may be associated with a first core of a CPU, a second batch group may be associated with a first core of a GPU, a third batch group may be associated with a second core of the GPU. In one embodiment, the determination of which batches or group of batches to associate with which core (GPU or CPU) may be based on availability or processing capability. For example, all batches associated with a rendering may be associated with a GPU core, as GPUs may handle rendering better. In another example, all batches associated with audio may be associated with a CPU core as a CPU core can be better suited to multitask.

At 430, the processing engine determines, based on the dependency links, a processing order for the batch. The dependency links may indicate which batches may need to be processed before other batches. The processing order for a batch may be indicated by a processing order value, which may be part of batch metadata. For example, if batch 2 depends on batch 1, then batch 1 must be processed first. As a result, batch 1 may have a processing order value of 1 and batch 2 may have a processing order value of 2. The processing engine may process all the jobs associated with batch 1 prior to processing the first job in batch 2. In addition, the processing order may be determined by the parallel strategy. For example, if the processing engine is operating in a sequential batch processing mode, then only one batch may be processed at a time regardless if that batch may be capable of being processed in parallel with another batch. In such an example, the processing engine may give each batch a specific processing order value such that each batch is processed sequentially and individually. After 430, the processing engine has formed one or more batches and processing orders associated with those batches.

At 435, the processing engine identifies a batch node for processing. The batch for processing may be a batch formed as a result of processes related to 400-430. The batch may also be associated with batch metadata. In one embodiment, multiple batches may be received for processing instead of a single batch. The identified batch may be associated with a first parallel scene graph that is associated with a first processing stage.

At 440, the processing engine identifies a plurality of jobs within the batch. Each received batch may have one or more jobs associated with it. These jobs may contain the actual processing to be performed. At 445, the processing engine assigns each job of the plurality of jobs to a different thread in a thread pool. The processing engine may maintain a thread pool such that there is a plurality of threads that may be executed asynchronously and/or in parallel. In one embodiment, particular threads in a thread pool may execute within different CPU or GPU cores. Each job is assigned to a thread based on availability of a thread such that a job is assigned to the next available thread. By implementing a thread pool there may be a reduction in the possibility of a bottleneck from a particular job taking a long time to process, because multiple jobs are all processed at the same time.

At 450, the processing engine processes, in parallel, each job until all jobs have been processed. In one embodiment, when multiple batches are received for processing (that may be all related to the same processing stage) the jobs for those multiple batches may be processed in parallel if their dependencies permit it. As a result, jobs associated with different batches may be processed in parallel.

At 455, the processing engine determines if there are additional batches to process. If there are additional batches to process, then process 400 moves to 435, but if there are not additional batches to process 400 moves to 460. At 460, the processing engine receives a second scene graph associated with a second processing stage. If there are no additional batches to process, then the processing stage associated with those batches may be complete and the processing unit moves onto the second processing stage. For example, a first parallel scene graph may have two batches associated with creating a depth map of a scene. Creating the depth map of a scene may be a first processing stage. The processing engine may process in parallel the jobs in the first of the two batches, and then process in parallel the jobs in the second of the two batches. This processing may result in the creation of a depth map (i.e., completion of the first processing stage). This depth map may be a first layer of results. The results being of the first processing stage. Once the creation of a depth map is complete, the processing engine may move onto a second processing stage such as determining surface normals associated with the depth map. The surface normals may be a second layer of results. The results being of the second processing stage. The processes described in process 400 may be repeated for the second processing stage until the second processing stage is complete. The processes described in process 400 may continue until all processing stages are completed. In one embodiment each processing stage produces a part of a deferred rendering pipeline and each processing stage may be overlaid onto the next processing stage to form a fully rendered image.

Figure 5:
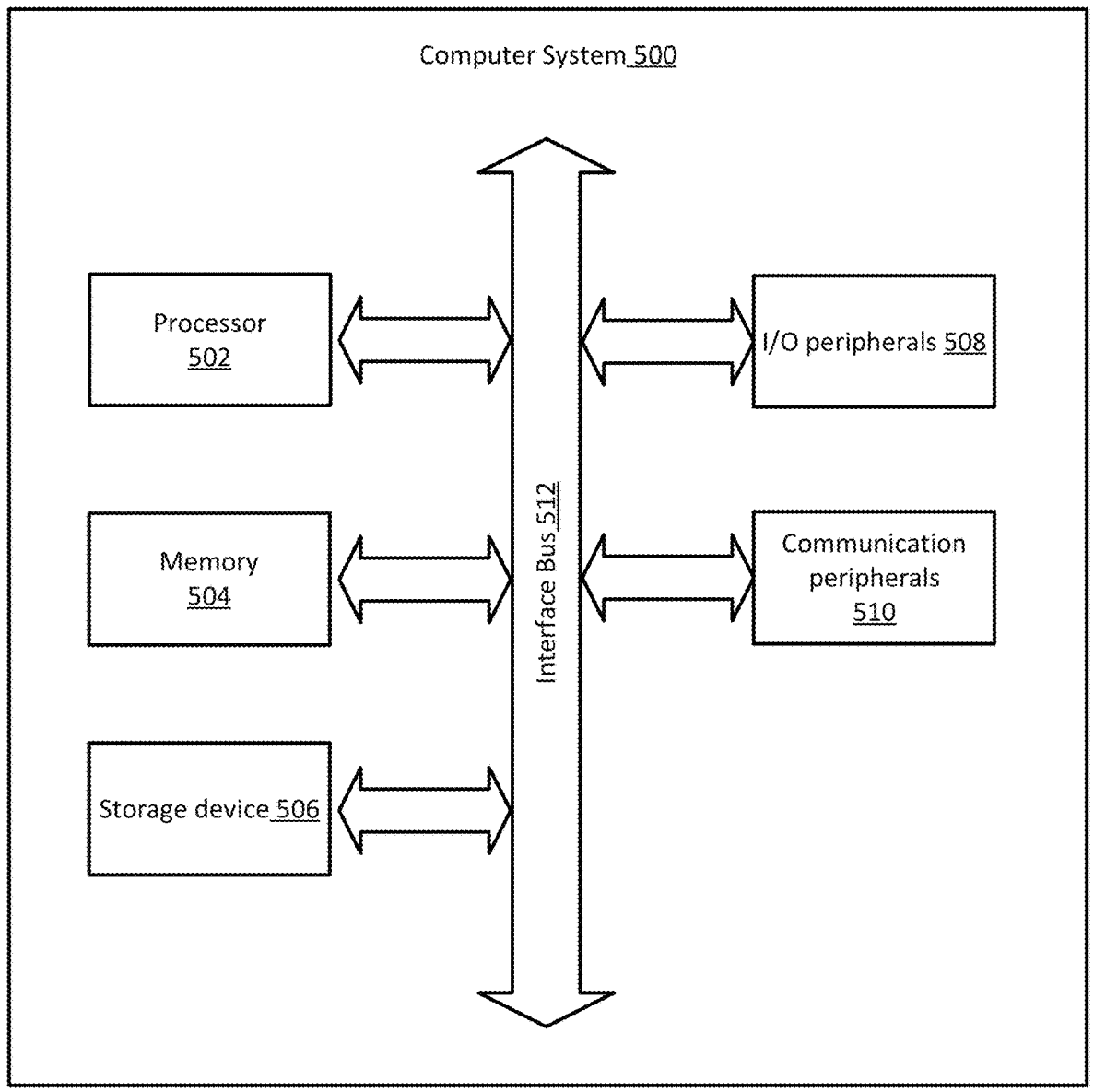
FIG. 5 illustrates an example computer system in accordance with one or more embodiments.

Any suitable computer system or group of computer systems can be used for performing the operations and processes described herein. For example, FIG. 5 depicts an example of the computer system 500. The implementation of computer system 500 could be used to perform one or more parts of process 400. Processing engine 102 in FIG. 1 may be implemented by computer system 500.

The depicted example of a computer system 500 includes a processor 502 communicatively coupled to one or more memory devices 504. The processor 502 executes computer-executable program code stored in a memory device 504, accesses information stored in the memory device 504, or both. Examples of the processor 502 include a microprocessor, an application-specific integrated circuit ("ASIC"), a field-programmable gate array ("FPGA"), or any other suitable processing device. The processor 502 can include any number of processing devices, including a single processing device.

A memory device 504 includes any suitable non-transitory computer-readable medium for storing program code or program data. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

A storage device 506 includes additional storage for computer system 500. In one embodiment, storage device 506 may be implemented by a hard drive disk and/or a steady state drive. In one embodiment, storage device 506 may store one or more sets of operations mapping and machine learning models.

The computer system 500 may also include a number of external or internal devices, such as a monitor, keyboard, mouse, or other input or output devices. For example, computer system 500 is shown with one or more input/output ("I/O") peripheral 508. An I/O peripheral 508 can receive input from input devices or provide output to output devices. One or more buses 512 are also included in the computer system 500. The bus 512 communicatively couples one or more components of a respective one of the computer system 500.

In some embodiments, the computer system 500 also includes a network communications peripherals 510. The network communications peripherals 510 include any device or group of devices suitable for establishing a wired or wireless data connection to one or more data networks. Non-limiting examples of the network communications peripherals 510 include an Ethernet network adapter, a modem, and/or the like. The computer system 500 is able to communicate with one or more other computer devices via a data network using network communications peripherals 510. For example, computer system 500 may receive one or more source images and/or target images via network communications peripherals 510.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computer," "calculating," "determining," and "identifying" or the like refer to actions or processes of a computer device, such as one or more computers or a similar electronic computer device or devices, that manipulate or transform data represented as physical electronic or magnetic quantities within memories, registers, or other information storage devices, transmission devices, or display devices of the computer platform.

The system or systems discussed herein are not limited to any particular hardware architecture or configuration. A computer device can include any suitable arrangement of components that provide a result conditioned on one or more inputs. Suitable computer devices include multi-purpose microprocessor-based computer systems accessing stored software that programs or configures the computer system from a general purpose computer apparatus to a specialized computer apparatus implementing one or more embodiments of the present subject matter. Any suitable programming, scripting, or other type of language or combinations of languages may be used to implement the teachings contained herein in software to be used in programming or configuring a computer device.

Embodiments of the methods disclosed herein may be performed in the operation of such computer devices. The order of the blocks presented in the examples above can be varied—for example, blocks can be re-ordered, combined, and/or broken into sub-blocks. Certain blocks or processes can be performed in parallel.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A system comprising:
one or more processors; and
a memory coupled with the one or more processors, the memory configured to store instructions that when executed by the one or more processors cause the one or more processors to:
receive a first plurality of batches, each batch in the first plurality of batches comprising multiple first processing jobs and the first plurality of batches are associated with first data objects in a first processing stage;
receive a second plurality of batches, each batch in the second plurality of batches comprising multiple second processing jobs and the second plurality of batches are associated with second data objects in a second processing stage;
identify a first dependency link between one or more batches in the first plurality of batches, the first dependency link indicating a processing order associated with the one or more batches in the first plurality of batches;
identify a second dependency link between one or more batches in the second plurality of batches, the second dependency link indicating a processing order associated with the one or more batches in the second plurality of batches;
process, for each batch in the first plurality of batches, the multiple first processing jobs in parallel to produce a first layer of results; and
in response to producing the first layer of results, process, for each batch in the second plurality of batches, the multiple second processing jobs in parallel to produce a second layer of results on top of the first layer.

2. The system of claim 1, wherein the instructions that when executed by the one or more processors further cause the one or more processors to:
receive a third plurality of batches, each batch in the third plurality of batches comprising multiple third processing jobs and the third plurality of batches are associated with the first data objects in the first processing stage;
identify a third dependency link between one or more batches in the third plurality of batches, the third dependency link indicating a processing order associated with the one or more batches in the third plurality of batches, the third dependency link being distinct from the first dependency link; and
prior to processing the first processing stage, process, for each batch in the third plurality of batches, the multiple third processing jobs in parallel to produce results for the first data objects.

3. The system of claim 1, wherein the first plurality of batches and the first dependency link are part of a first data graph, wherein each batch of the first plurality of batches is a node within the first data graph and the first dependency link indicates relationships between each node.

4. The system of claim 1, wherein the second plurality of batches and the second dependency link are part of a second data graph, wherein each batch of the second plurality of batches is a node within the second data graph and the second dependency link indicates relationships between each node.

5. The system of claim 1, wherein a processing job is an atomic unit for processing.

6. The system of claim 1, wherein the first data objects and the second data objects are the same data objects.

7. The system of claim 1, wherein the one or more processors are one or more graphical processing units.

8. A computer-implemented method comprising:
receiving a first plurality of batches, each batch in the first plurality of batches comprising multiple first processing jobs and the first plurality of batches are associated with first data objects in a first processing stage;
receiving a second plurality of batches, each batch in the second plurality of batches comprising multiple second processing jobs and the second plurality of batches are associated with second data objects in a second processing stage;
identifying a first dependency link between one or more batches in the first plurality of batches, the first dependency link indicating a processing order associated with the one or more batches in the first plurality of batches;
identifying a second dependency link between one or more batches in the second plurality of batches, the second dependency link indicating a processing order associated with the one or more batches in the second plurality of batches;
processing, for each batch in the first plurality of batches, the multiple first processing jobs in parallel to produce a first layer of results; and
in response to producing the first layer of results, processing, for each batch in the second plurality of batches, the multiple second processing jobs in parallel to produce a second layer of results on top of the first layer.

9. The computer-implemented method of claim 8, further comprising:
receiving a third plurality of batches, each batch in the third plurality of batches comprising multiple third processing jobs and the third plurality of batches are associated with the first data objects in the first processing stage;
identifying a third dependency link between one or more batches in the third plurality of batches, the third dependency link indicating a processing order associated with the one or more batches in the third plurality of batches, the third dependency link being distinct from the first dependency link; and
prior to processing the first processing stage, processing, for each batch in the third plurality of batches, the multiple third processing jobs in parallel to produce results for the first data objects.

10. The computer-implemented method of claim 8, wherein the first plurality of batches and the first dependency link are part of a first data graph, wherein each batch of the first plurality of batches is a node within the first data graph and the first dependency link indicates relationships between each node.

11. The computer-implemented method of claim 8, wherein the second plurality of batches and the second dependency link are part of a second data graph, wherein each batch of the second plurality of batches is a node within the second data graph and the second dependency link indicates relationships between each node.

12. The computer-implemented method of claim 8, wherein a processing job is an atomic unit for processing.

13. The computer-implemented method of claim 8, wherein the first data objects and the second data objects are the same data objects.

14. A non-transitory computer-readable storage medium having stored thereon instructions for causing at least one computer system for parallel processing, the instructions comprising:

receiving a first plurality of batches, each batch in the first plurality of batches comprising multiple first processing jobs and the first plurality of batches are associated with first data objects in a first processing stage;

receiving a second plurality of batches, each batch in the second plurality of batches comprising multiple second processing jobs and the second plurality of batches are associated with second data objects in a second processing stage;

identifying a first dependency link between one or more batches in the first plurality of batches, the first dependency link indicating a processing order associated with the one or more batches in the first plurality of batches;

identifying a second dependency link between one or more batches in the second plurality of batches, the second dependency link indicating a processing order associated with the one or more batches in the second plurality of batches;

processing, for each batch in the first plurality of batches, the multiple first processing jobs in parallel to produce a first layer of results; and in response to producing the first layer of results, processing, for each batch in the second plurality of batches, the multiple second processing jobs in parallel to produce a second layer of results on top of the first layer.

15. The computer-readable storage medium of claim 14, the instructions further comprising:

receiving a third plurality of batches, each batch in the third plurality of batches comprising multiple third processing jobs and the third plurality of batches are associated with the first data objects in the first processing stage;

identifying a third dependency link between one or more batches in the third plurality of batches, the third dependency link indicating a processing order associated with the one or more batches in the third plurality of batches, the third dependency link being distinct from the first dependency link; and prior to processing the first processing stage, processing, for each batch in the third plurality of batches, the multiple third processing jobs in parallel to produce results for the first data objects.

16. The computer-readable storage medium of claim 14, wherein the first plurality of batches and the first dependency link are part of a first data graph, wherein each batch of the first plurality of batches is a node within the first data graph and the first dependency link indicates relationships between each node.

17. The computer-readable storage medium of claim 14, wherein the second plurality of batches and the second dependency link are part of a second data graph, wherein each batch of the second plurality of batches is a node within the second data graph and the second dependency link indicates relationships between each node.

18. The computer-readable storage medium of claim 14, wherein a processing job is an atomic unit for processing.

19. The computer-readable storage medium of claim 14, wherein the first data objects and the second data objects are the same data objects.

20. The computer-readable storage medium of claim 14, wherein the at least one computer system comprises of one or more graphical processing units.

* * * * *